US011078622B2

United States Patent
Yoon et al.

(10) Patent No.: US 11,078,622 B2
(45) Date of Patent: Aug. 3, 2021

(54) CONVEYING DEVICE AND FABRIC TREATING APPARATUS HAVING THE SAME

(71) Applicant: LG ELECTRONICS INC., Seoul (KR)

(72) Inventors: Jihyun Yoon, Seoul (KR); Jeongjoon Roh, Seoul (KR); Ayeong Lee, Seoul (KR); Jeonguk Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/577,189

(22) Filed: Sep. 20, 2019

(65) Prior Publication Data
US 2020/0095724 A1 Mar. 26, 2020

(30) Foreign Application Priority Data

Sep. 20, 2018 (KR) ........................ 10-2018-0112783

(51) Int. Cl.
*B65G 27/04* (2006.01)
*B65G 25/00* (2006.01)
(Continued)

(52) U.S. Cl.
CPC ............. *D06F 73/02* (2013.01); *B65G 27/04* (2013.01); *B65G 27/08* (2013.01); *B65G 2201/0229* (2013.01)

(58) Field of Classification Search
CPC ....... B65G 27/04; B65G 25/00; B65G 37/005
(Continued)

(56) References Cited

U.S. PATENT DOCUMENTS 3,696,523 A * 10/1972 Beeley .................... D06F 73/02
34/216
3,739,496 A * 6/1973 Buckley .................. D06F 73/02
34/210
(Continued)

FOREIGN PATENT DOCUMENTS

DE 4116185 11/1992
EP 2 191 907 6/2010
(Continued)

OTHER PUBLICATIONS

European Search Report dated Feb. 18, 2020 issued in Application No. 19198705.6.

*Primary Examiner* — Douglas A Hess
(74) *Attorney, Agent, or Firm* — KED & Associates LLP

(57) ABSTRACT

A fabric treating apparatus including: a cabinet defining a treating chamber in which clothes is accommodated; a heating unit for supplying at least one of hot air and steam into the treating chamber; and a conveying device for conveying clothes positioned outside the cabinet to the inside of the cabinet, wherein the conveying device includes: a frame including at least two sliding surfaces inclined downward in a first direction, and at least two restraining surfaces that is disposed between the two sliding surfaces and defines a surface intersecting the sliding surfaces; a lifter including at least two inclined surfaces inclined downward in the first direction, and at least two intersecting surfaces that is disposed between the two inclined surfaces and defines a surface intersecting the inclined surfaces; and a drive unit which moves the lifter in a vertical direction intersecting the first direction, wherein each of the intersecting surface is disposed on an arbitrary line parallel to each of the sliding surfaces in the vertical direction.

20 Claims, 11 Drawing Sheets

(51) Int. Cl.
*D06F 73/02* (2006.01)
*B65G 27/08* (2006.01)

(58) Field of Classification Search
USPC .............. 198/570, 584, 604, 605, 614, 681; 68/5 C, 5 D
See application file for complete search history.

(56) References Cited

U.S. PATENT DOCUMENTS

| | | | | |
|---|---|---|---|---|
| 3,765,580 A * | 10/1973 | Wilsker | ................ | D06F 73/02 223/52 |
| 4,059,974 A * | 11/1977 | Fleissner | ................ | D06B 3/16 68/15 |
| 4,304,053 A * | 12/1981 | Kellerhals | ................ | D06F 73/02 34/225 |
| 4,391,602 A * | 7/1983 | Stichnoth | ................ | D06F 73/02 223/51 |
| 4,512,280 A | 4/1985 | Lee, Jr. | | |
| 4,585,114 A * | 4/1986 | Liliano | ................ | B21B 25/06 198/570 |
| 4,711,342 A * | 12/1987 | Abraham | ................ | B22D 33/00 198/463.3 |
| 5,174,351 A * | 12/1992 | Lindenblatt | ............ | B27B 5/228 144/242.1 |
| 5,374,157 A * | 12/1994 | Allard | ................ | B27B 31/00 198/774.3 |
| 6,471,729 B1 * | 10/2002 | Voth | ................ | D06B 19/0035 68/5 D |
| 6,761,261 B2 * | 7/2004 | Dussault | ................ | B65G 25/08 198/773 |
| 8,151,392 B2 * | 4/2012 | Littmann | ................ | D06F 73/02 8/149.3 |
| 8,806,903 B2 * | 8/2014 | Frushtick | ................ | D06F 73/02 68/5 C |
| 9,790,623 B2 * | 10/2017 | Brenk | ................ | D02G 1/205 |
| 10,006,161 B2 * | 6/2018 | Dana | ................ | D06F 59/02 |

FOREIGN PATENT DOCUMENTS

KR         10-0496925        6/2005
WO     WO 2008/072786     6/2008

* cited by examiner

200A

CONVEYING DEVICE AND FABRIC TREATING APPARATUS HAVING THE SAME

CROSS-REFERENCE TO RELATED APPLICATION

This application claims the benefit of Korean patent application no. 10-2018-0112783, filed on Sep. 20, 2018, which is hereby incorporated by reference as if fully set forth herein.

BACKGROUND OF THE INVENTION

1. Field of the Invention

The present invention relates to a conveying device and a fabric treating apparatus, and more particularly, to a conveying device capable of conveying clothes to a treating chamber one by one with a simple structure, and a fabric treating apparatus.

2. Description of the Related Art

A fabric treating apparatus refers to all devices for managing or treating clothes such as washing, drying, or removing wrinkles of clothes in a home or a laundry. For example, a fabric treating apparatus may include a washing machine for washing clothes, a dryer for drying clothes, a washer-drier for both washing and drying functions, a refresher for refreshing clothes, a steamer for removing unnecessary wrinkles of clothes, and the like.

More specifically, the refresher is a device for making clothes more comfortable and fresh, and performs functions such as drying clothes, supplying fragrance to clothes, preventing the generation of static electricity of clothes, or removing wrinkles of clothes. A steamer is a device that removes wrinkles of clothes by simply supplying steam to the clothes. Unlike a general iron, the steamer can delicately remove wrinkles of the clothes as a hot plate does not touch the clothes.

The fabric treating apparatus having the functions of the refresher and the steamer may perform functions such as wrinkles and odor removal of the clothes stored therein by using steam and hot air. Due to this function, the clothes stored in clothes reproducing apparatus can remove the odor particles contaminating the clothes, or wrinkles to achieve an ironing effect.

Conventional fabric treating apparatus accommodates a plurality of clothes or a single clothes in a single large treating chamber, and removes wrinkles by applying hot air, steam, or mechanical force to the clothes. However, in order to treat a large number of clothes in succession, a clothes conveying device is required.

The conveying device of Korean Patent Publication No. 10-2003-0078295 has a complicated configuration such as an elevator 3 for conveying a hanger; a guide body 20 having a shape that allows the hanger to be hung and slid down, a plurality of cylinders 21, a plurality of blocking bars 22 to 24, a hanger hanging tool 10, a conveying line 6, a conveyor belt drive unit 7, and the like.

When the hanger hanging tool 10 passes in front of the blocking bar, in order to hang the hanger on the hanger hanging tool 10, a sensor for detecting the hanger should be installed on the blocking bar. In addition, when a first blocking bar 22 is lifted, a plurality of blocking bars 22 to 24 are installed in order to prevent the other hangers from descending together, so that it operates in a complicated sequence.

Therefore, the conventional clothes conveying device has a complicated structure so that it is difficult to manufacture, the manufacturing cost is increased, and it is very likely to cause a failure due to a complex structure.

SUMMARY OF THE INVENTION

The present invention has been made in view of the above problems, and provides a conveying device for sequentially and continuously treating a large number of clothes, and a fabric treating apparatus.

The present invention further provides a conveying device for sequentially conveying clothes to a treating chamber through a single drive device and then discharging them from the treating chamber, and a fabric treating apparatus.

The present invention further provides a conveying device and a fabric treating apparatus which have a simple and reliable structure by combining the shape of the upper surface of a frame and the shape of the upper surface of a lifter, and are easy to manufacture.

The present invention further provides a conveying device and a fabric treating apparatus which have a low height, a small occupied space, and a large clothes treating capacity, because a mover moving back and forth moves a lifter up and down.

In order to achieve the above object, in the conveying device, when the lifter moves in a vertical direction, a conveyed object is slid forward from the upper surface of the lifter and the frame.

In detail, the conveying device includes: a frame including at least two sliding surfaces inclined downward in a first direction, and at least two restraining surfaces that is disposed between the two sliding surfaces and defines a surface intersecting the sliding surfaces; a lifter including at least two inclined surfaces inclined downward in the first direction, and at least two intersecting surfaces that is disposed between the two inclined surfaces and defines a surface intersecting the inclined surfaces; and a drive unit which moves the lifter in a vertical direction intersecting the first direction, wherein each of the intersecting surface is disposed on an arbitrary line parallel to each of the sliding surfaces in the vertical direction.

Each of the restraining surfaces connects the sliding surfaces adjacent to each other.

A lower end of each of the restraining surfaces is connected to a lower end of one of the sliding surfaces adjacent to each other, and an upper end of each of the restraining surfaces is connected to an upper end of one of the sliding surfaces adjacent to each other.

The restraining surface is extended in parallel to the vertical direction.

An inclination angle of the sliding surface with respect to the first direction ranges from 20° to 70°.

Each of the sliding surfaces is disposed not to be overlapped with each other in the vertical direction.

Each of the intersecting surfaces connects the inclined surfaces adjacent to each other.

A lower end of each of the intersecting surfaces is connected to a lower end of one of the inclined surfaces adjacent to each other, and an upper end of the intersecting surfaces is connected to an upper end of one of the inclined surfaces adjacent to each other.

A length of each of the sliding surfaces is the same as a length of each of the inclined surfaces.

The number of the sliding surfaces is the same as the number of the inclined surfaces.

The frame includes: a treating area in which an object to be conveyed is treated, and which comprises one sliding surface and one restraining surface connected to each other; and a preparation area which is positioned before the object to be conveyed is conveyed to the treating area, and which includes at least two sliding surfaces and at least two restraining surfaces.

A length of the sliding surface of the treating area is longer than a length of the sliding surface of the preparation area.

The conveying device further includes a discharge area in which an object to be conveyed treated in a treating area is conveyed, and in which one sliding surface and one restraining surface connected to each other, wherein a length of the sliding surface of the discharge area is longer than a length of the sliding surface of the preparation area.

A plurality of frames are provided, and the lifter and the drive unit have a number corresponding to a number of the frame.

The drive unit includes: a linear motor which linearly moves in the first direction; and a mover which moves the lifter up and down by reciprocating in the first direction by the linear motor.

The mover includes a moving surface inclined downward in the first direction, wherein the lifter comprises a guide surface which is in contact with at least a part of the moving surface and inclined downward in the first direction.

The conveying device further includes a roller for reducing contact between the moving surface and the guide surface.

An object to be conveyed is lifted by the lifter on the one sliding surface and conveyed to the sliding surface of a next stage.

In addition, the present invention includes: a cabinet defining a treating chamber in which clothes is accommodated; a heating unit for supplying at least one of hot air and steam into the treating chamber; and a conveying device for conveying clothes positioned outside the cabinet to the inside of the cabinet, wherein the conveying device includes: a frame including at least two sliding surfaces inclined downward in a first direction, and at least two restraining surfaces that is disposed between the two sliding surfaces and defines a surface intersecting the sliding surfaces; a lifter including at least two inclined surfaces inclined downward in the first direction, and at least two intersecting surfaces that is disposed between the two inclined surfaces and defines a surface intersecting the inclined surfaces; and a drive unit which moves the lifter in a vertical direction intersecting the first direction, wherein each of the intersecting surface is disposed on an arbitrary line parallel to each of the sliding surfaces in the vertical direction.

Some area in a middle of the frame in the first direction is positioned inside the cabinet.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. As used herein, the singular form is intended to include the plural forms as well, unless the context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

Hereinafter, the present invention will be described with reference to the drawings for explaining a fabric treating apparatus according to embodiments of the present invention.

Figure 1:
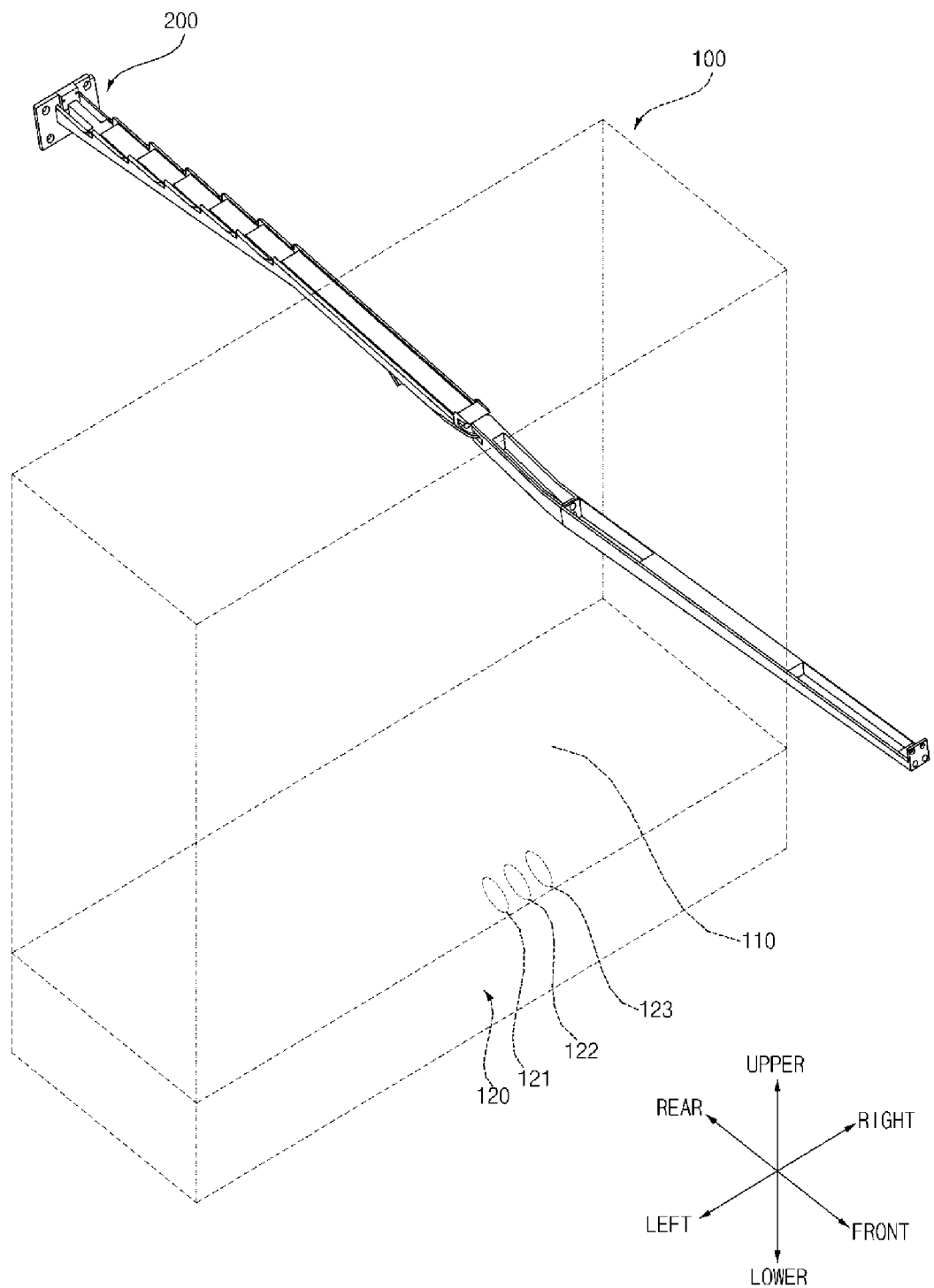
FIG. 1 is a perspective view of a fabric treating apparatus according to an embodiment of the present invention.

FIG. 1 is a perspective view of a fabric treating apparatus according to an embodiment of the present invention.

Referring to FIG. 1, a fabric treating apparatus 10 may include a treating chamber 110 in which clothes are accommodated, a heating unit 120 supplying at least one of hot air and steam into the treating chamber 110, and a conveying device 200 conveying clothes in one direction.

The treating chamber 110 may be formed in a cabinet 100.

The treating chamber 110 is a space for applying hot air or steam to clothes so as to change the physical or chemical properties of the clothes. That is, it is a space where clothes treating is performed in various manners such as drying clothes by applying hot air, spreading wrinkles on clothes by using steam, treating clothes to have a smell by spraying air fresheners, or preventing static electricity in clothes by spraying antistatic agent.

At least one surface of the treating chamber 110 is opened to allow clothes to enter and exit, and the opened surface is opened and closed by a door (not shown). The treating chamber 110 is isolated from the outside when the door is closed, and the treating chamber 110 is exposed to the outside when the door is opened.

In detail, the treating chamber 110 may have two opened surfaces facing each other. The door installed in the opened surface may be slid or rotated to open and close the treating chamber 110.

The heating unit 120 may be disposed below the treating chamber 110. The heating unit 120 sucks and heats the air inside the treating chamber 110 and blows hot air into the treating chamber 110, or generates steam by being supplied with water and applying heat to the water and discharges the generated steam into the treating chamber 110.

Obviously, the heating unit 120 may be implemented to supply hot air and steam together into the treating chamber 110, or may be implemented to selectively supply either hot air or steam. The heating unit 120 may be variously implemented by those skilled in the art to supply hot air and/or steam.

In one embodiment of the present invention, the heating unit 120 may include an air suction port 121 for sucking air inside the treating chamber 110, a heater (not shown) for heating the sucked air, a hot air discharge port 122 discharges the air heated by the heater into the treating chamber 110, and a steam spray port 123 for spraying steam into the treating chamber 110.

Hot air and/or steam generated by the heating unit 120 is applied to the clothes accommodated in the treating chamber 110 to affect the physical or chemical properties of the clothes. That is, the tissue structure of the clothes is relaxed by hot air or steam, so that wrinkles are spread, and an unpleasant odor is removed as odor molecules that are pervaded into clothing react with steam. In addition, the hot air and/or steam generated by the heating unit 120 has the effect of sterilizing the bacteria parasitic on the clothes.

The hot air supplied by the heating unit 120 retains moisture while drying the clothes stored in the treating chamber 110. The hot air containing moisture flows to the upper portion of the treating chamber 110, and is condensed as it meets the inner wall of the treating chamber 110. In particular, when steam is supplied into the treating chamber 110 by the heating unit 120, the condensation phenomenon on the inner wall of the treating chamber 110 becomes more severe. If the water condensed on the inner wall of the treating chamber 110 is left as it is after the operation of the fabric treating apparatus 10 is completed, odor may be generated and bacteria may breed to cause hygiene problems. The blowing fan (not shown) may circulate air inside the treating chamber 110, thereby preventing condensation from forming on the inner wall of the treating chamber 110, and maintaining a clean state inside the treating chamber 110.

The conveying device 200 that hangs and conveys a hanger (not shown) may be disposed in the upper portion of the treating chamber 110. The conveying device 200 sequentially conveys the hanger hung on the conveying device 200 in one direction, thereby conveying clothes in one direction.

Hereinafter, the conveying device 200 for conveying the clothes will be described in detail.

Figure 2:
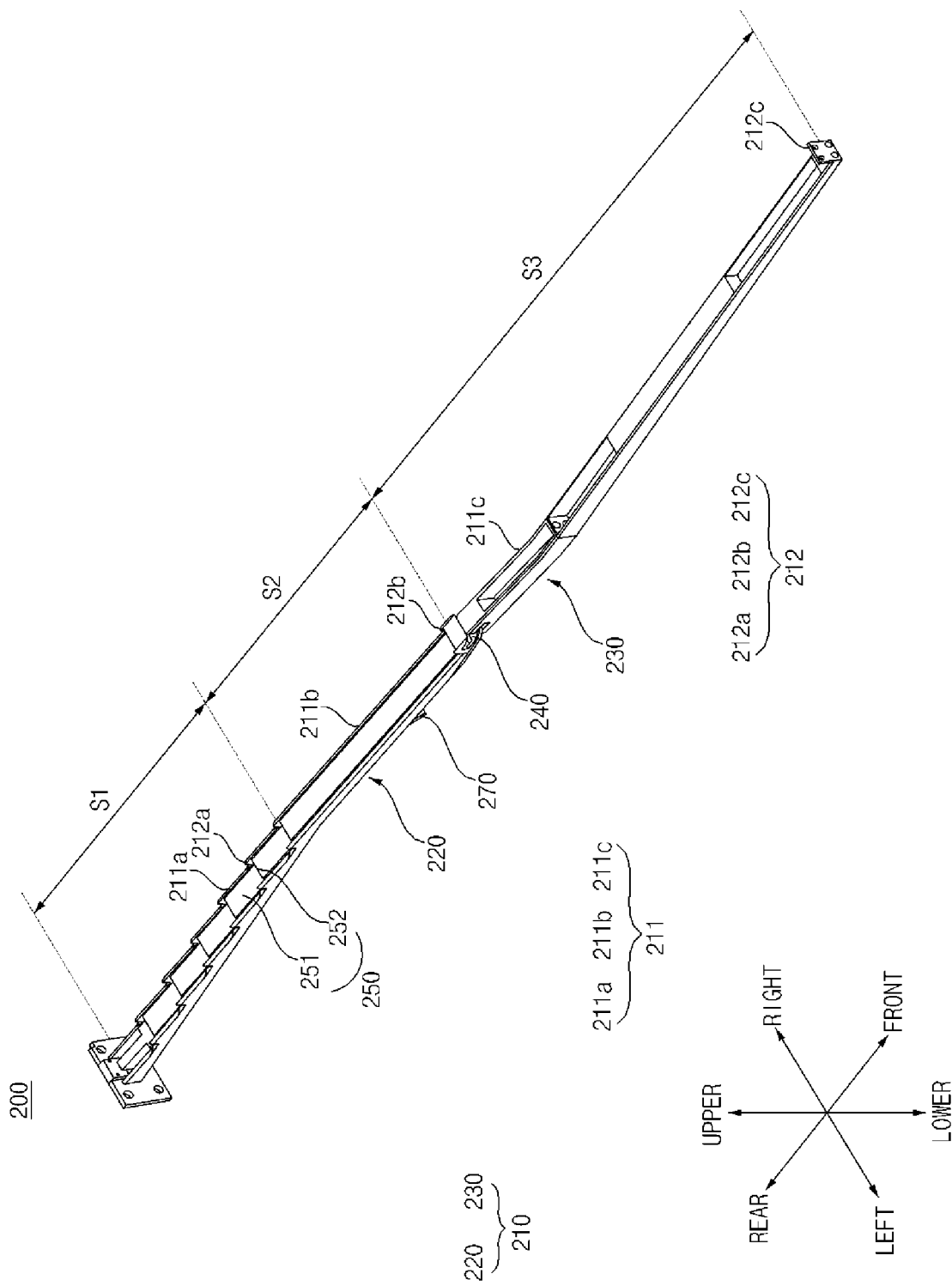
FIG. 2 is a perspective view of a conveying device according to an embodiment of the present invention.
Figure 3:
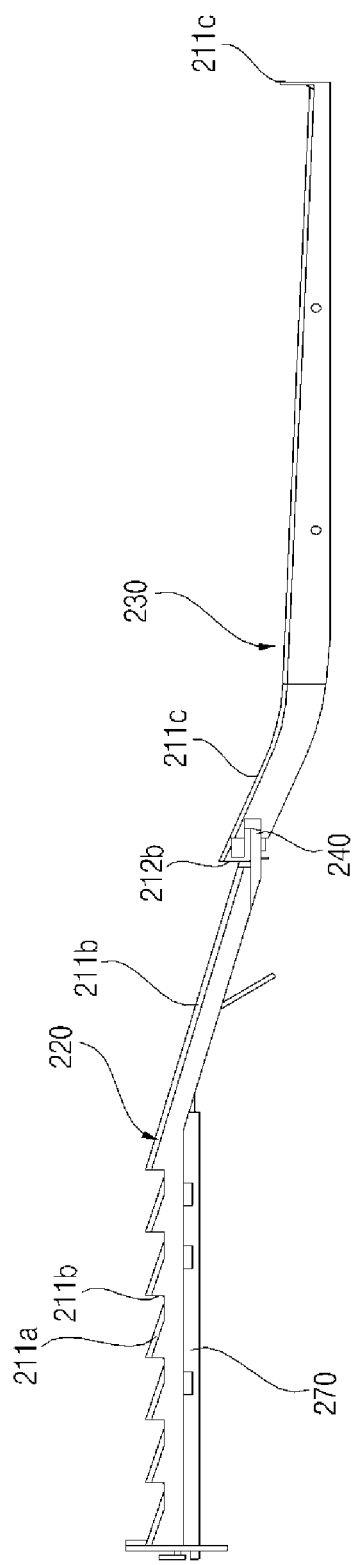
FIG. 3 is a front view of the conveying device of FIG. 2.
Figure 4:
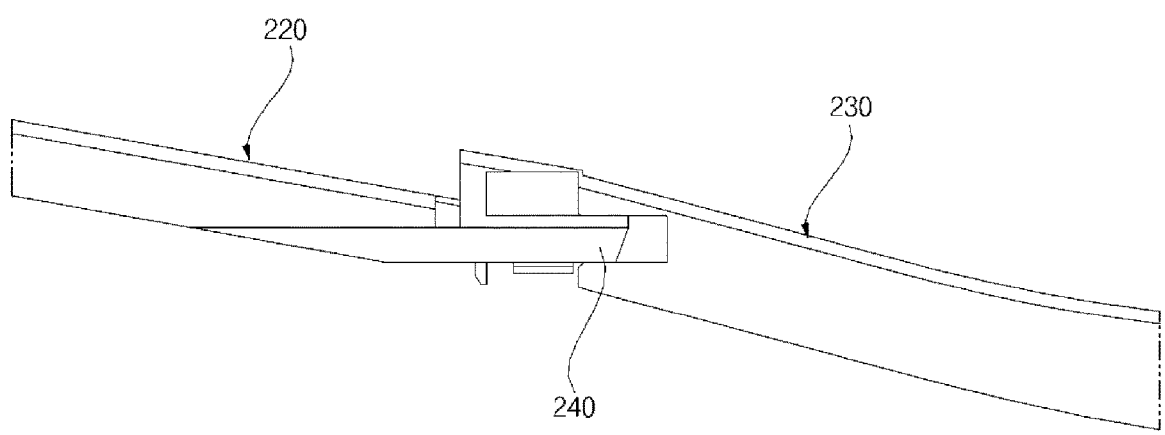
FIG. 4 is a diagram illustrating a connection portion between a first frame and a second frame of the conveying device of FIG. 2.

FIG. 2 is a perspective view of a conveying device according to an embodiment of the present invention, FIG. 3 is a front view of the conveying device of FIG. 2, and FIG. 4 is a diagram illustrating a connection portion between a first frame and a second frame of the conveying device of FIG. 2.

Referring to FIGS. 2 to 4, the conveying device 200 according to an embodiment of the present invention may include a frame 210, a lifter 250, and a drive unit.

The conveying device 200 allows the object 1 to be conveyed (hanger) hung on in the frame 210 to move in a horizontal direction due to an inclined plane structure of the upper surface of the frame 210 and the vertical movement of the lifter 250.

The frame 210 defines a space on which the clothes caught in the hanger is hung, and which accommodates the lifter 250. The frame 210 has a shape extended in one direction. For example, the frame 210 may be divided into a preparation area S1, a treating area S2, and a discharge area S3 along the length direction. Both ends of the frame 210 are the preparation area S1 and the discharge area S3, and the treating area S2 is positioned between the preparation area S1 and the discharge area S3.

The treating area S2 of the frame 210 may be positioned inside the treating chamber 110, the preparation area S1 of the frame 210 may be disposed in one side of the outside of the treating chamber 110, and the discharge area S3 of the frame 210 may be disposed in the other side of the outside of the treating chamber 110, The frame 210 may be formed in one configuration to have a structure that cannot be folded. However, in the present embodiment, the frame 210 may have a foldable structure, while having at least one hinge 240.

For example, the frame 210 may include a first frame 220, and a second frame 230 connected to one end of the first frame 220 by a hinge 240 to be rotatable. The first frame 220 and the second frame 230 are folded in the vertical direction as an axis. Therefore, when not used, the frame 210 may be folded and accommodated inside the treating chamber 110, and when used, both ends of the frame 210 may be exposed to the outside of the treating chamber 110.

The frame 210 may include at least two sliding surfaces 211 inclined downward in a first direction (toward the front from the rear), and at least two restraining surfaces 212 disposed between the two sliding surfaces 211 and defining a surface intersecting the sliding surfaces 211.

As a whole, the upper surface of the frame 210 may have a structure in which the sliding surface 211 and the restraining surface 212 are alternately disposed toward the front from the rear.

Each sliding surface 211 and restraining surface 212 define an upper surface of the frame 210. The sliding surface 211 is a surface on which the object 1 to be conveyed positioned on the sliding surface 211 is slid by its own weight.

The sliding surface 211 has an inclination that decreases as it progresses from the rear to the front. The sliding surface 211 preferably has an inclination to the extent that at least the object 1 to be conveyed positioned on the sliding surface 211 is slid by its own weight. Specifically, the inclination angle of the sliding surface 211 with respect to the first direction may be 20° to 70°.

At least a part of the sliding surface 211 may be parallel to the horizontal direction or may have a very small inclination angle. Specifically, the front end of the sliding surface 211 may be formed in parallel with the horizontal direction, thereby providing a space on which the object to be conveyed is hung.

The length or inclination angle of each sliding surface 211 may be different from each other or may be the same. In detail, the length of the sliding surface 211 formed in the preparation area S1 of the frame 210 may be smaller than the length of the sliding surface 211 formed in the treating area S2 of the frame 210 and the length of the sliding surface 211 formed in the discharge area S3 of the frame 210. In addition, the number of sliding surfaces 211 of the treatment area S2 or the discharge area S3 may be smaller than the number of sliding surfaces 211a of the preparation area S1.

It is preferable that the number of the sliding surfaces 211b of the discharge area S3 and the treating area S2 is one, and the number of the sliding surfaces 211a of the preparation area S1 is between 5 and 10.

Therefore, by the length and number of the sliding surface 211, the number of clothes to be treated in the treatment area S2 can be adjusted, and the number of clothes to be prepared in the preparation area S1 can be adjusted.

The restraining surface 212 is disposed between two sliding surfaces 211 adjacent to each other, and defines a surface intersecting with the sliding surfaces 211 adjacent to each other. That is, the restraining surface 212 is a surface having an inclination with respect to the sliding surface 211 so that the object 1 to be conveyed is not able to be slid due to the inclination of the sliding surface 211 but is restrained to be positioned.

Each restraining surface 212 connects the sliding surfaces 211 adjacent to each other. Specifically, the lower end of each restraining surface 212 is connected to the lower end of one of the sliding surfaces 211 adjacent to each other, and the upper end of each restraining surface 212 is connected to the upper end of one of the sliding surfaces 211 adjacent to each other. More specifically, the lower end of the restraining surface 212 is connected to the front end of the sliding surface 211 positioned in the rear side of the restraining surface 212, and the upper end of the restraining surface 212 is connected to the rear end of the sliding surface 211 positioned in the front side of the restraining surface 212. Therefore, the upper surface of the frame 210 has a sawtooth shape by the restraining surface 212 and the sliding surface 211.

The restraining surface 212 may have an inclination inclined upward from the rear side toward the front side or may be extended in parallel to the vertical direction. If the inclination of the restraining surface 212 is too low, the object 1 to be conveyed cannot be restrained, so that the inclination angle of the restraining surface 212 with respect to the horizontal plane is preferably 30° to 100°. This is because, when the inclination angle of the restraining surface 212 exceeds 100°, the object 1 to be conveyed is difficult to be lifted by the lifter 250. The object 1 to be conveyed is restrained by a restraining area in which the rear end of the restraining surface 212 and the front end of the sliding surface 211 positioned in the rear the restraining surface 212 are connected.

Each of the sliding surfaces 211 is preferably disposed not to be overlapped with each other in the vertical direction. This is because, when the sliding surfaces 211 are overlapped with each other in the vertical direction, the movement of the object 1 to be conveyed becomes difficult when the lifter 250 is in operation.

The height or inclination angle of each restraining surface 212 may be different from each other or may be the same. Specifically, the height of the restraining surface 212 formed in the preparation area S1 of the frame 210 may be equal to the height of the restraining surface 212 formed in the treating area S2 of the frame 210 and the height formed in the discharge area S3 of the frame 210. In addition, the number of restraining surfaces 212 of the treating area S2 or the discharge area S3 may be smaller than the number of restraining surfaces 212a of the preparation area S1. It is preferable that the number of restraining surfaces 212b of the discharge area S3 and the treating area S2 is one, and the number of restraining surfaces 212a of the preparation area S1 is between five and ten.

Specifically, the preparation area S1 may include at least two sliding surfaces 211 and two restraining surfaces 212, the treating area S2 may include one sliding surface 211 and one restraining surface 212, and the discharge area S3 may include one sliding surface 211 and one restraining surface 212.

The first frame 220 may include the preparation area S1 and the treating area S2, and the second frame 230 may include the discharge area S3.

Hereinafter, the first frame 220 and a configuration combined with the first frame 220 will be described in detail.

Figure 5:
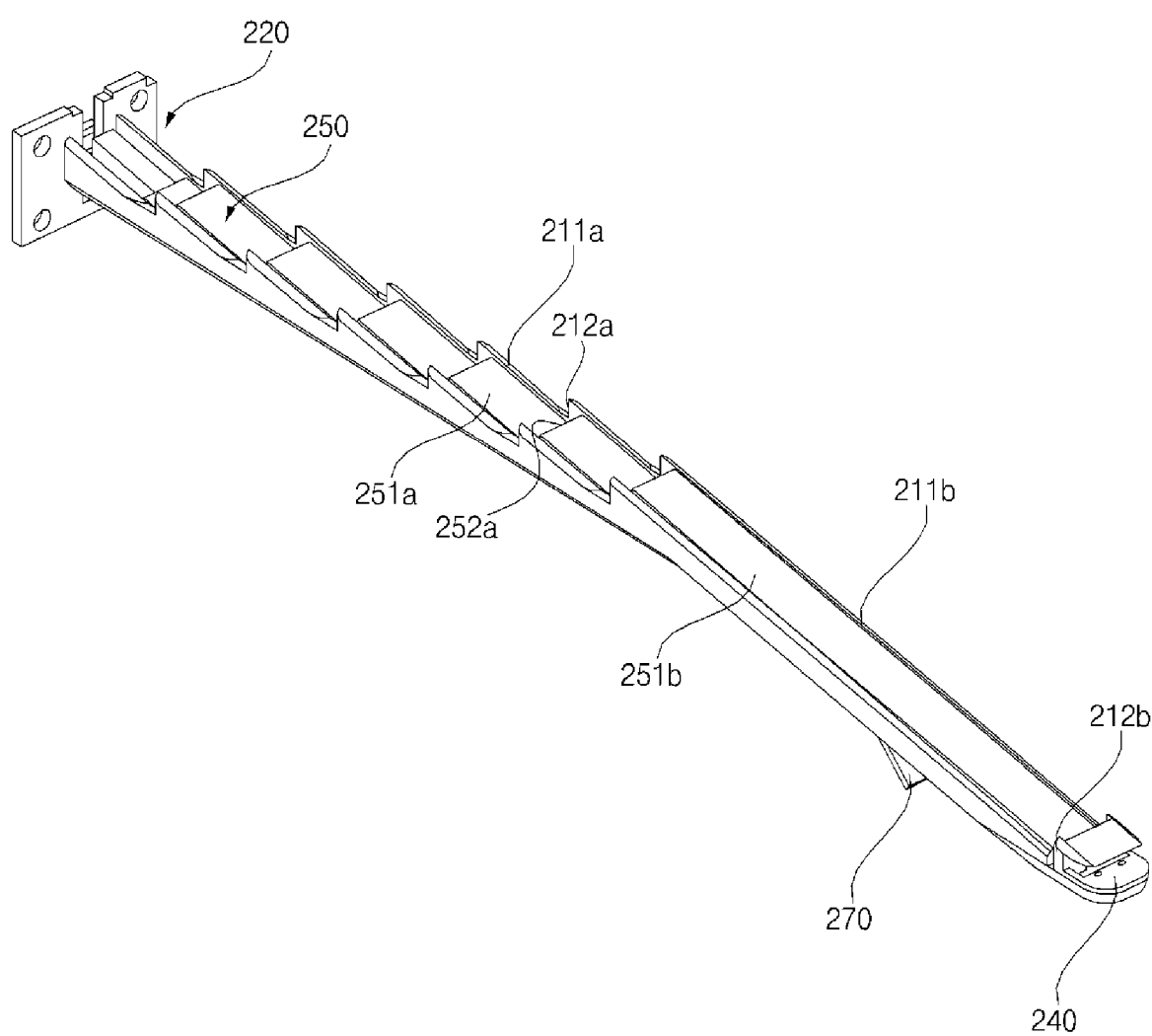
FIG. 5 is a perspective view of the first frame shown in FIG. 2 and a surrounding configuration.
Figure 6:
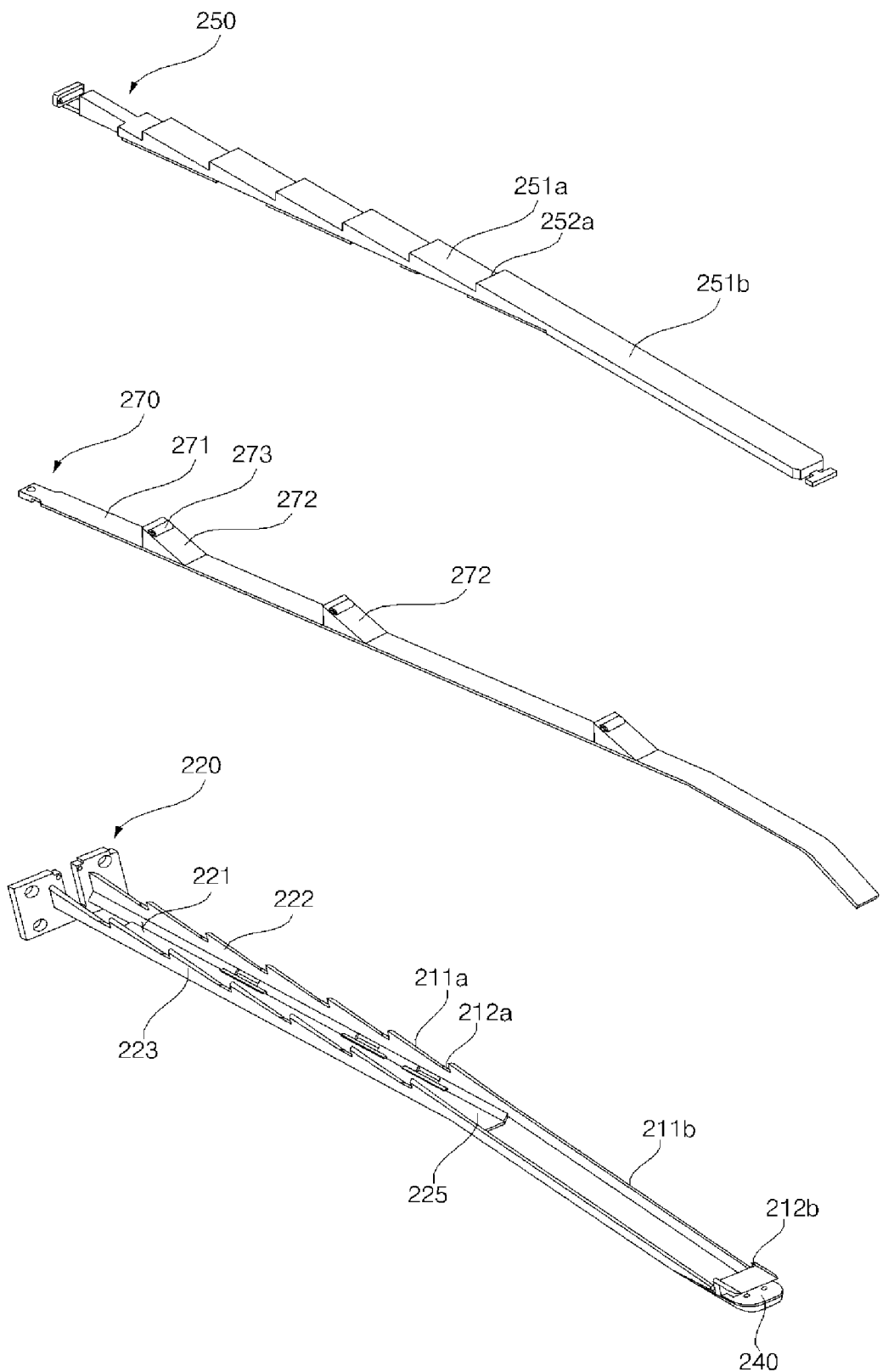
FIG. 6 is an exploded perspective view of the configuration shown in FIG. 5.
Figure 7:
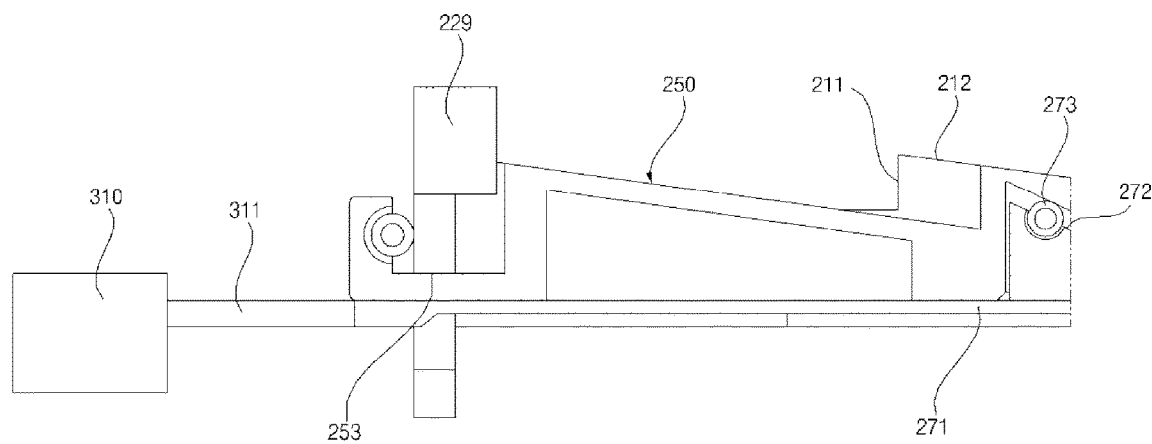
FIG. 7 is a partial cross-sectional view of a conveying device according to an embodiment of the present invention.
Figure 8:
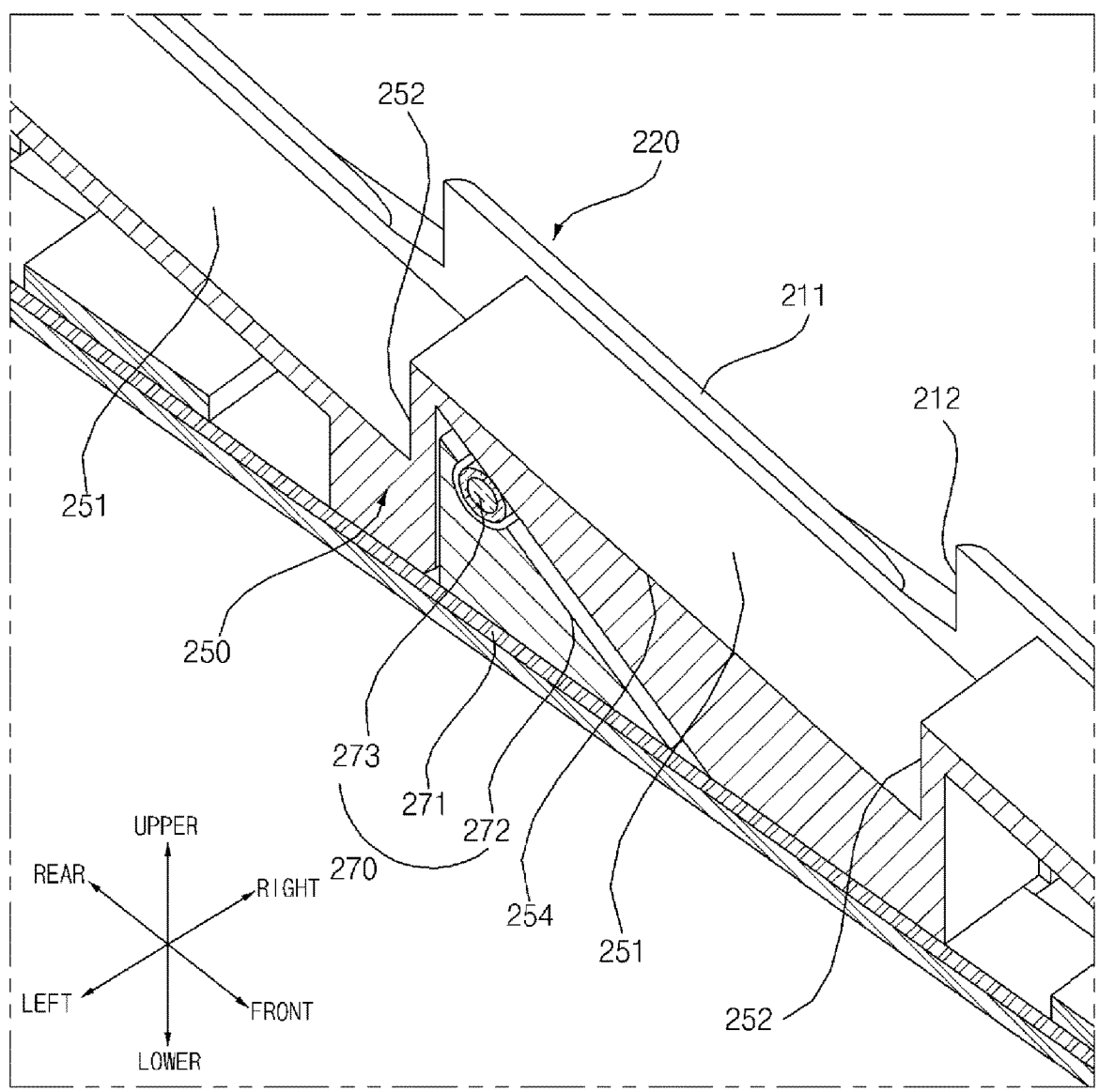
FIG. 8 is an operation diagram showing the operation of a conveying device according to an embodiment of the present invention.
Figure 9:
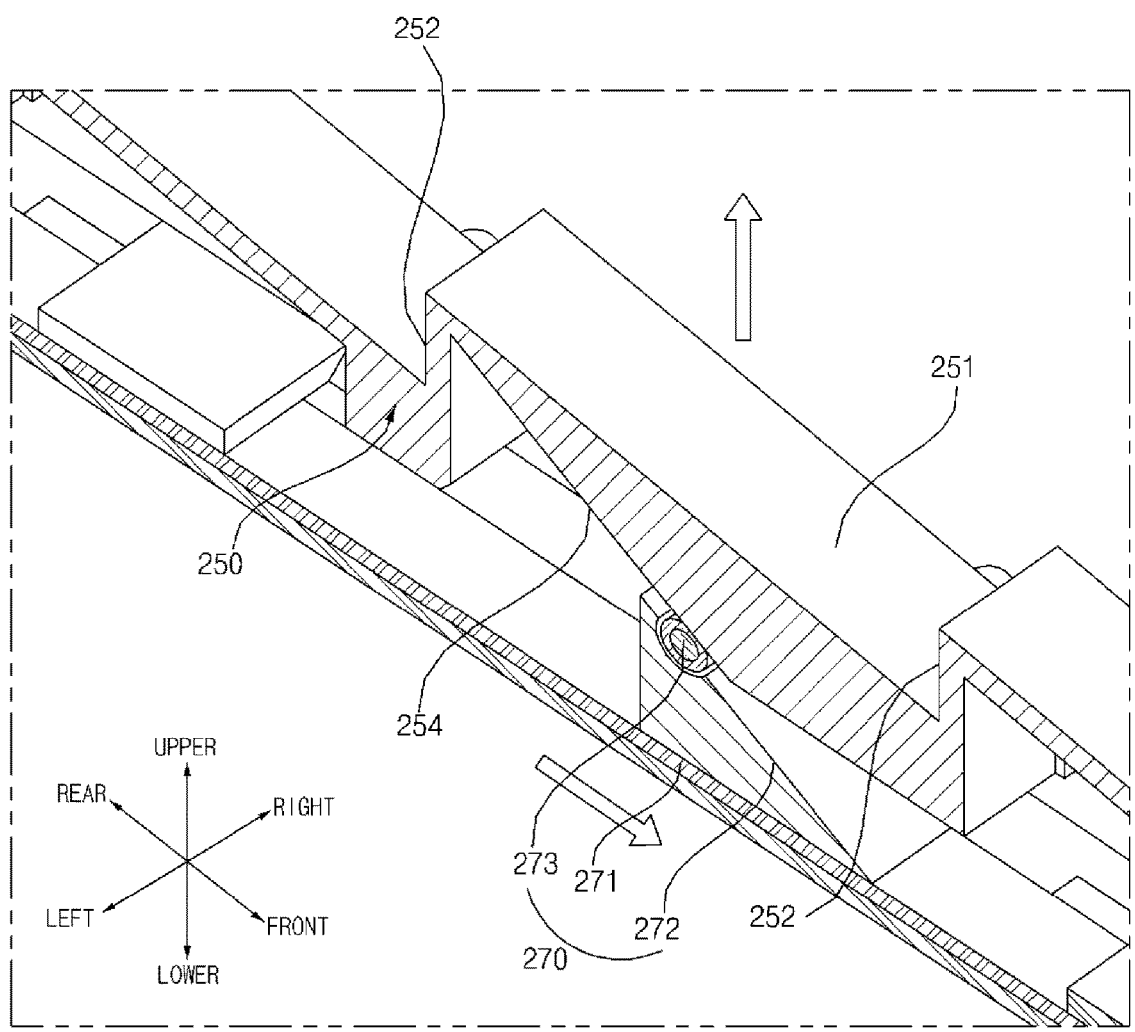
FIG. 9 is an operation diagram showing the operation of a conveying device according to an embodiment of the present invention.

FIG. 5 is a perspective view of the first frame shown in FIG. 2 and a surrounding configuration, FIG. 6 is an exploded perspective view of the configuration shown in FIG. 5, FIG. 7 is a partial cross-sectional view of a conveying device according to an embodiment of the present invention, FIG. 8 is an operation diagram showing the operation of a conveying device according to an embodiment of the present invention, and FIG. 9 is an operation diagram showing the operation of a conveying device according to an embodiment of the present invention.

Referring to FIGS. 5 to 9, the first frame 220 may have a structure in which the lifter 250 and a mover 270 described later are accommodated and the sliding surface 211 and the restraining surface 212 are formed on an upper surface thereof.

For example, the first frame 220 may include a first member 222 and a second member 223 that are disposed to be spaced apart and face each other, and extended in a front-rear direction, and a third member 225 that connects between the first member 222 and the second member 223.

A channel 221 for accommodating the lifter 250 and the mover 270 is formed between the first member 222 and the second member 223. The channel 221 may be opened in the front-rear direction and the upper direction. A linear motor 310 described later is connected through the rear of the channel 221. Due to a structure in which the lifter 250 and the mover 270 are accommodated in the channel 221, the conveying device 200 may be manufactured to be slim.

The sliding surface 211a and the restraining surface 212a of the preparation area S1 may be formed on the upper surface of the first member 222 and the second member 223. In addition, the sliding surface 211b and the restraining surface 212b of the treating area S2 may be formed on the upper surface of the first member 222 and the second member 223. A hinge 240 may be positioned in the front end of the first member 222 and the second member 223.

The lifter 250 may be provided in each of the plurality of frames 210, or a single lifter 250 may be provided in the plurality of frames 210. In the present embodiment, in order to reduce the manufacturing cost, the lifter 250 may be provided with a single lifter 250 in the first frame 220. That is, the lifter 250 may be disposed in the preparation area S1 and the treating area S2 of the first frame 220.

When the object 1 to be conveyed lifted from the treatment area S2 by the lifter 250 is positioned in the sliding surface 211 of the discharge area S3, the object 1 to be conveyed is conveyed by itself to the front end of the discharge area S3 by its own weight. In the discharge area S3, the lifter 250 may not be disposed.

The lifter 250 may have a structure of moving the object 1 to be conveyed positioned in the restraining area onto the sliding surface 211 of a next stage. Here, the sliding surface 211 of the next stage is a sliding surface 211 connected to the front end of the restraining surface 212 as a reference, and the sliding surface 211 of a previous stage may be defined as a sliding surface 211 connected to the rear end of the restraining surface 212 as a reference.

The lifter 250 is accommodated in the channel 221 of the first frame 220, so that the front-rear movement is restrained and the vertical movement is restrained. In addition, the frame 210 may be provided with a stopper 229 that restrains the movement of the lifter 250 in the upper direction. The lower limit of the lifter 250 is defined by the third member 225, and the upper limit of the lifter 250 is defined by the stopper 229. Obviously, the lifter 250 may be provided with a stop groove 253 coupled to the stopper 229.

For example, the lifter 250 may include at least two inclined surfaces 251 inclined downward in a first direction, and at least two intersecting surfaces 252 disposed between the two inclined surfaces 251 and defining a surface intersecting the inclined surfaces 251.

As a whole, the upper surface of the lifter 250 may have a structure in which the inclined surface 251 and the intersecting surface 252 are alternately disposed from the rear to the front.

Each inclined surface 251 and the intersecting surface 252 define an upper surface of the lifter 250. The inclined surface 251 is a surface on which the object 1 to be conveyed positioned on the inclined surface 251 is slid by its own weight.

The inclined surface 251 has an inclination that decreases as it progresses from the rear to the front. The inclined surface 251 preferably has an inclination such that at least the object 1 to be conveyed positioned on the inclined surface 251 is slid by its own weight. Specifically, the inclination angle of the inclined surface 251 with respect to the first direction may be 20° to 70°.

The length or inclination angle of each inclined surface 251 may be different from each other or may be the same. The lifter 250 may be divided into the preparation area S1 and the treating area S2. The length of the inclined surface 251a of the preparation area S1 may be smaller than the length of the inclined surface 251b of the treating area S2. In addition, the number of the inclined surface 251b of the treating area S2 may be smaller than the number of the inclined surface 251a of the preparation area S1. It is preferable that the number of the inclined surfaces 251b of the treating area S2 is one, and the number of the inclined surface 251a of the preparation area S1 is between five and ten. More preferably, the inclined surface 251a of the preparation area S1 of the lifter 250 has the number corresponding to the number of sliding surface 211a of the preparation area S1 of the frame 210, and the inclined surface 251b of the treating area S2 of the lifter 250 has the number corresponding to the number of sliding surface 211b of the treating area S2 of the frame 210.

The intersecting surface 252 is disposed between two inclined surfaces 251 adjacent to each other, and defines a surface intersecting with the inclined surfaces 251 adjacent to each other. That is, the intersecting surface 252 is a surface having an inclination with respect to the inclined surface 251 so that the object 1 to be conveyed cannot be slid but is restrained and positioned due to the inclination of the inclined surface 251.

Each intersecting surface 252 connects the inclined surfaces 251 adjacent to each other. Specifically, the lower end of each intersecting surface 252 is connected to the lower end of one of the inclined surfaces 251 adjacent to each other, and the upper end of each intersecting surface 252 is connected to the upper end of one of the inclined surfaces 251 adjacent to each other. More specifically, the lower end of the intersecting surface 252 is connected to the front end of the inclined surface 251 positioned in the rear side of the intersecting surface 252, and the upper end of the intersecting surface 252 is connected to the rear end of the inclined surface 251 positioned in the front side of the intersecting surface 252. Accordingly, the upper surface of the lifter 250 is serrated by the intersecting surface 252 and the inclined surface 251.

The intersecting surface 252 may have an inclination inclined upward from the rear side toward the front side, or may be extended in parallel to the vertical direction. If the inclination of the intersecting surface 252 is too low, the object 1 to be conveyed cannot be restrained, so that the inclination angle of the intersecting surface 252 with respect to the horizontal plane is preferably 30° to 100°.

Each of the inclined surfaces 251 is preferably disposed not to be overlapped with each other in the vertical direction. This is because when the inclined surfaces 251 are overlapped with each other in the vertical direction, the movement of the object 1 to be conveyed becomes difficult when the lifter 250 is in operation.

The height or inclination angle of each intersecting surface 252 may be different from each other or may be the same. In detail, the height of the intersecting surface 252 of the preparation area S1 may be equal to the height of the intersecting surface 252 of the treating area S2. In addition, the number of the intersecting surfaces 252 of the treating area S2 may be smaller than the number of intersecting surfaces 252 of the preparation area S1. It is preferable that the number of the intersecting surfaces 252 of the treating area S2 is one, and the number of the intersecting surfaces 252 of the preparation area S1 is between five and ten.

Specifically, the preparation area S1 may include at least two inclined surfaces 251 and two intersecting surfaces 252, and the treating area S2 may include one inclined surface 251 and one intersecting surface 252.

The number of sliding surfaces 211 may be the same as the number of inclined surfaces 251. Preferably, the number of the inclined surface 251 and the intersecting surface 252 formed in the preparation area S1 of the lifter 250 corresponds to the number of the sliding surface 211 and the restraining surface 212 formed in the preparation area S1 of the frame 210.

The length of each sliding surface 211 may be the same as the length of each inclined surface 251. Preferably, the length of the inclined surface 251 formed in the preparation area S1 of the lifter 250 may be the same as the length of the sliding surface 211 formed in the preparation area S1 of the frame 210, and the length of the inclined surface 251 formed in the treating area S2 of the lifter 250 may be the same as the length of the sliding surface 211 formed in the treating area S2 of the frame 210.

The lifter 250 may be provided with a guide surface 254 for guiding the movement of the mover 270 described later. The guide surface 254 moves the lifter 250 in the vertical direction by the movement of the mover 270 reciprocating in the front-rear direction.

In detail, the guide surface 254 may be inclined downward as it progresses from the rear side to the front side. The guide surface 254 may include a straight or curved line. The guide surface 254 may form a lower surface of the lifter 250. The guide surface 254 moves the lifter 250 in the vertical direction by a relative movement with the mover 270.

Each of the intersecting surfaces 252 and the respective sliding surfaces 211 may have a disposition for moving the object 1 to be conveyed to the sliding surface 211 of a next stage, when the lifter 250 is moved upward. For example, each intersecting surface 252 is disposed on an arbitrary line parallel to each sliding surface 211 in a vertical direction. That is, each intersecting surface 252 is disposed on the same line parallel to each sliding surface 211 in the vertical direction. In the front-rear direction, each intersecting surface 252 is disposed between each sliding surface 211.

Specifically, the restraining surface 212 of the frame 210 and the intersecting surface 252 of the lifter 250 are alternately disposed in the front-rear direction, and the sliding surface 211 of the frame 210 and the inclined surface 251 of the lifter 250 may be alternately disposed in the front-rear direction. More specifically, the restraining surface 212 of the frame 210 is disposed in the front end, and the restraining surface 212 and the intersecting surface 252 are alternately disposed from the front side to the rear side.

More specifically, each intersecting surface 252 is disposed on an arbitrary line parallel to each sliding surface 211 in the vertical direction, and each restraining surface 212 is disposed on an arbitrary line parallel to the inclined surface 251 in the vertical direction.

The drive unit moves the lifter 250 in the vertical direction intersecting the first direction (front-rear direction). The drive unit may have the number corresponding to the number of frames 210, whereas a plurality of frames 210 may be provided and a single drive unit may be provided.

The drive unit may have a structure for moving the lifter 250 in the vertical direction by the driving force of the drive motor. For example, the drive unit may be a linear motor 310 reciprocating in the vertical direction. However, when the drive unit is installed to move in the vertical direction, the height of the conveying device 200 becomes too large.

As another example, the drive unit may include a linear motor 310 linearly moving in the first direction, and a mover 270 for vertically moving the lifter 250 by reciprocating in the first direction by the linear motor 310.

The linear motor 310 is disposed in the rear side of the frame 210. The linear motor 310 includes a cylinder 311 reciprocating in the front-rear direction. The cylinder 311 of the linear motor 310 is connected to the rear end of the mover 270.

The mover 270 converts the front-rear movement of the linear motor 310 into a vertical movement. Specifically, the mover 270 may include at least one moving surface 272 inclined downward in the first direction and a moving body 271 in which the moving surface 272 is disposed.

The moving body 271 is extended long in the front-rear direction, and has a length corresponding to at least the first frame 220. Preferably, at least two moving surfaces 272 are spaced apart from each other. The moving surface 272 is disposed to be inclined downward in the first direction, so that when the mover 270 moves forward by interacting with the guide surface 254 formed in the lifter 250, the lifter 250 is moved upward.

The guide surface 254 of the lifter 250 may be in contact with at least part of the moving surface 272. The guide surface 254 and the moving surface 272 may slide with each other. A roller for reducing contact between the moving surface 272 and the guide surface 254 may be further included to reduce the frictional force. The roller may allow the guide surface 254 and the moving surface 272 to be spaced apart to reduce friction. The roller is installed on the moving surface 272 to be rotatable.

The mover 270 is accommodated in the channel 221 of the frame 210. The mover 270 is accommodated in such manner that the vertical movement is restrained inside the channel 221, and the movement in the front-rear direction is possible.

In particular, with reference to FIGS. 8 and 9, the object 1 to be conveyed is initially positioned in a restraining area in contact with the restraining surface 212. At this time, the upper surface of the lifter 250 is positioned below the upper surface of the frame 210.

When the mover 270 moves forward so as to move the object 1 to be conveyed to the next stage, the lifter 250 moves upward by the interaction of the moving surface 272 and the guide surface 254. The object 1 to be conveyed is moved upward along the restraining surface 212 by the inclined surface 251 of the lifter 250. When the inclined surface 251 of the lifter 250 is positioned higher than the restraining surface 212, the object 1 to be conveyed slides forward along the inclination of the inclined surface 251 of the lifter 250, and is restrained to the intersecting surface 252 of the lifter 250. Then, when the lifter 250 is lowered and the upper surface of the lifter 250 is positioned below the upper surface of the frame 210, the object 1 to be conveyed restrained to the intersecting surface 252 of the lifter 250 is positioned on the sliding surface 211 of the next stage, and slid forward along the inclination of the sliding surface 211 of the next stage and is positioned in contact with the restraining surface 212 of the next stage.

Accordingly, the object 1 to be conveyed is lifted by the lifter 250 from one sliding surface 211, and slides on the upper surface of the lifter, and then is conveyed to the sliding surface 211 of the next stage.

Hereinafter, the operation of the conveying device 200 will be described in more detail.

Figure 10A:
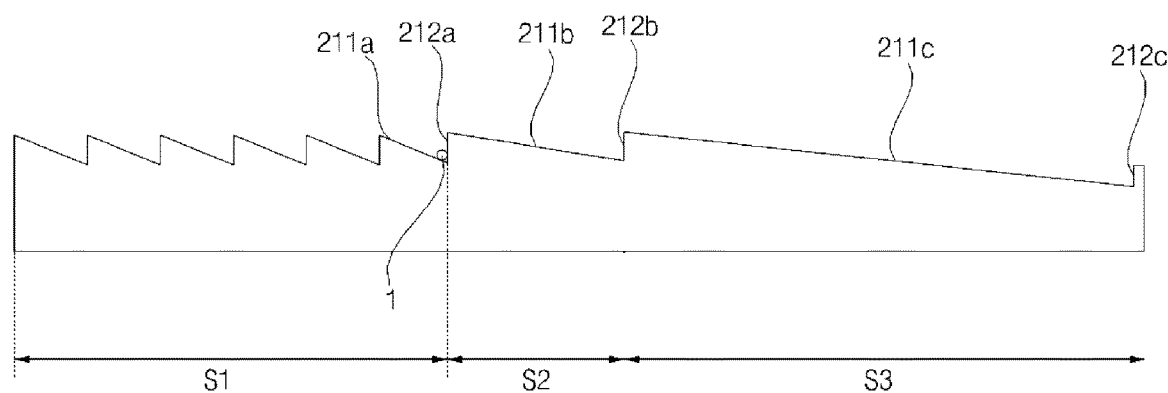
FIGS. 10A to 10C are an operation diagram showing the principle of conveying an object to be conveyed by the operation of a lifter of the present invention.
Figure 10B:
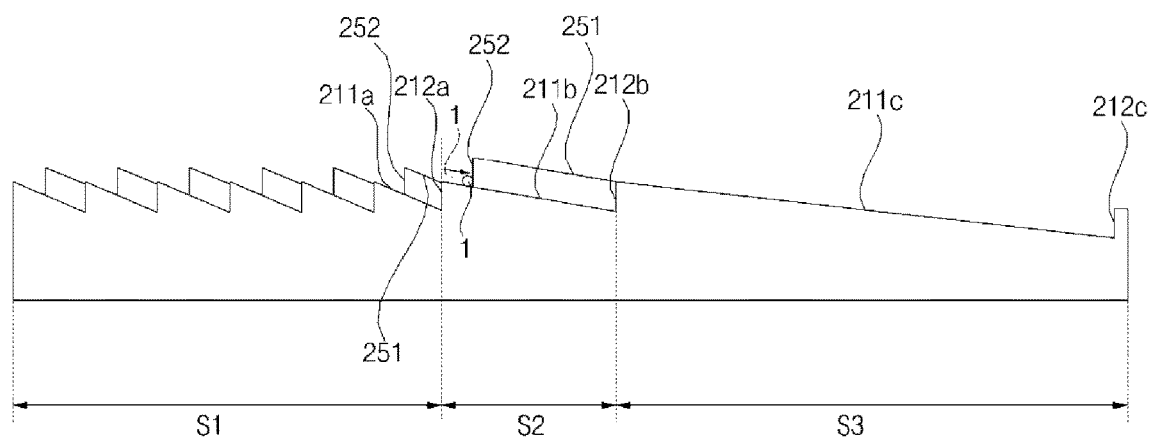
Figure 10C:
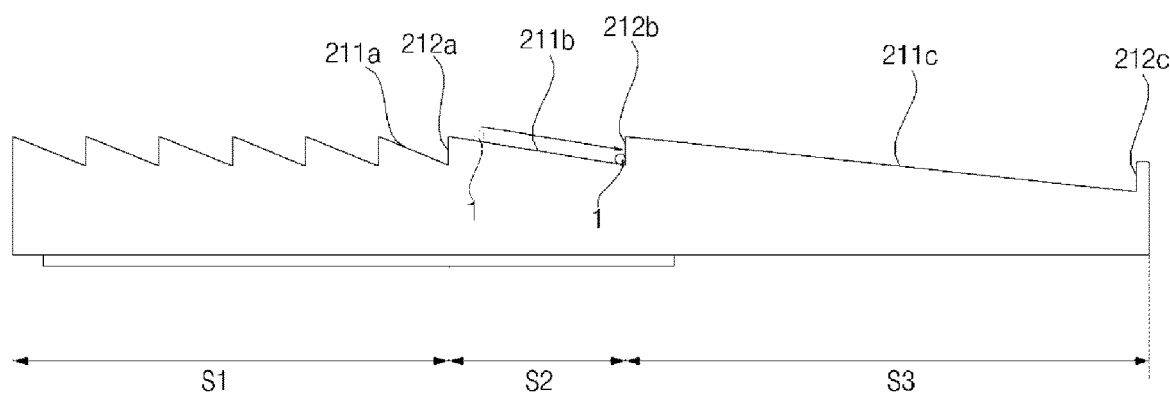

FIGS. 10A to 10C are an operation diagram showing the principle of conveying an object to be conveyed by the operation of a lifter of the present invention.

Referring to FIG. 10A, the object 1 to be conveyed is positioned in the restraining area which is in contact with the restraining surface 212 of the distal end of the preparation area S1. At this time, the upper surface of the lifter 250 is positioned below the upper surface of the frame 210.

Referring to FIG. 10B, when the mover 270 moves forward so as to move the object 1 to be conveyed to the next stage, the lifter 250 is moved upward by the interaction of the moving surface 272 and the guide surface 254. The object 1 to be conveyed is moved upward along the restraining surface 212 by the inclined surface 251 of the distal end of the preparation area S1 of the lifter 250. When the inclined surface 251 of the lifter 250 is positioned higher than the restraining surface 212, the object 1 to be conveyed slides forward along the inclination of the inclined surface 251 of the lifter 250, and is restrained to the intersecting surface 252 of the distal end of the preparation area S1.

Referring to FIG. 10C, when the lifter 250 is lowered and the upper surface of the lifter 250 is positioned below the upper surface of the frame 210, the object 1 to be conveyed restrained by the intersecting surface 252 of the preparation area S1 of the lifter 250 is positioned on the sliding surface 211b of the treating area S2 of the frame 210, slides forward along the inclination of the sliding surface 211b of the treating area S2, and is positioned in contact with the restraining surface 212b of the treating area S2. Obviously, the other objects 1 to be conveyed positioned in the preparation area S1 is also conveyed forward stage by stage.

Figure 11:
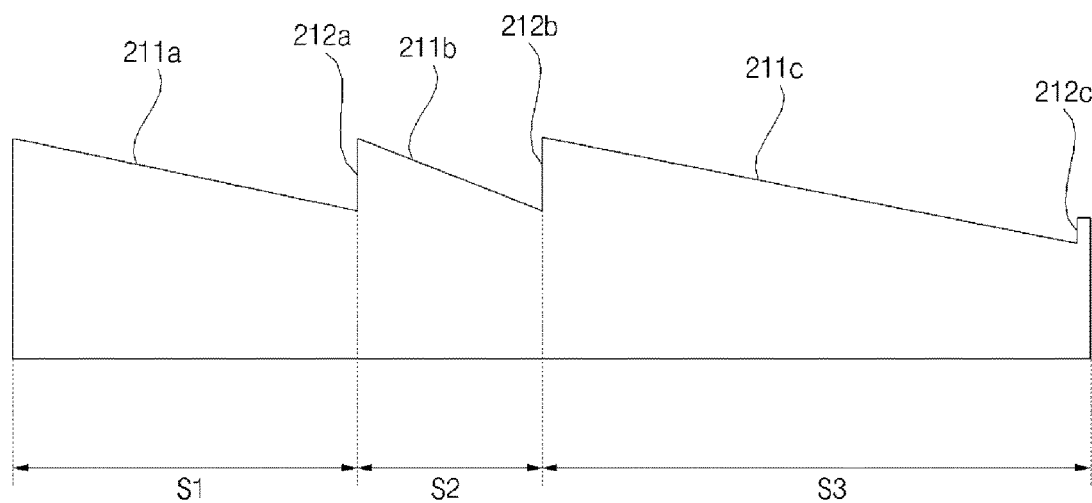
FIG. 11 is a conceptual diagram of a conveying device according to another embodiment of the present invention.

FIG. 11 is a conceptual diagram of a conveying device 200A according to another embodiment of the present invention.

Referring to FIG. 11, in comparison with the conveying device 200 of FIGS. 2 to 9, the conveying device 200A according to another embodiment may have a difference in the configuration of the preparation area S1 and the structure of the frame 210. Hereinafter, the differences from the embodiment of FIGS. 2 to 9 will be mainly described, and unless otherwise described, the configuration is the same as the embodiment of FIGS. 2 to 9.

As another example, the frame 210 may have a structure that is not folded in the middle. The preparation area S1 of another embodiment may include one sliding surface 211 and one restraining surface 212, and may have one inclined surface 251 and one intersecting surface 252. When a plurality of objects 1 to be conveyed are hung on the preparation area S1, the object 1 to be conveyed is slid by its own weight and is biased toward the front end of the preparation area S1.

When the plurality of objects 1 to be conveyed are hung on a preparation space, the lifter 250 may have a structure for conveying a single object 1 to be conveyed into a treating space. For example, the position of the intersecting surface 252 of the preparation area S1 disposed on the same line in the vertical direction as the restraining surface 212 of the preparation space is disposed to be spaced apart from the rear surface is spaced apart rearward from the restraining surface 212 of the preparation space by a first distance, and the first distance may correspond to the width of a single conveyed object.

The air conditioner of the present invention having the above configuration has the following effects.

The present invention has a structure in which a large number of clothes are sequentially supplied to the treating chamber and discharged from the treating chamber, thereby automatically treating a large number of clothes.

In addition, the present invention, when the mover moves in the front-rear direction through a single drive device, the lifter moves in the vertical direction while clothes is supplied to the treating chamber and discharged from the treating chamber, thereby reducing the manufacturing cost by a simple structure, increasing durability by a simple structure, and easily manufacturing.

In addition, the drive unit of the present invention is disposed in front-rear direction with the lifter, and the lifter is moved up and down by the mover moving in the front-rear direction, so that the height of the conveying device is lowered, and the space to treats the clothes is increased.

In addition, since the present invention has a structure for folding the frame constituting the conveying device, the size is reduced when the fabric treating apparatus is not used. Accordingly, it is easy to store the fabric treating apparatus when not used.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

What is claimed is:

1. A conveying device comprising:
   a frame comprising at least two sliding surfaces inclined downward in a first direction, and at least two restraining surfaces that is disposed between the two sliding surfaces and defines a surface intersecting the sliding surfaces;
   a lifter comprising at least two inclined surfaces inclined downward in the first direction, and at least two intersecting surfaces that is disposed between the two inclined surfaces and defines a surface intersecting the inclined surfaces; and
   a drive unit which moves the lifter in a vertical direction intersecting the first direction,
   wherein each of the intersecting surface is disposed on an arbitrary line parallel to each of the sliding surfaces in the vertical direction,
   wherein the frame comprises:
      a treating area in which an object to be conveyed is treated, and which comprises one sliding surface and one restraining surface connected to each other; and
      a preparation area which is positioned before the object to be conveyed is conveyed to the treating area, and which comprises at least two sliding surfaces and at least two restraining surfaces.

2. The conveying device of claim 1, wherein each of the restraining surfaces connects the sliding surfaces adjacent to each other.

3. The conveying device of claim 2, wherein a lower end of each of the restraining surfaces is connected to a lower end of one of the sliding surfaces adjacent to each other, and an upper end of each of the restraining surfaces is connected to an upper end of one of the sliding surfaces adjacent to each other.

4. The conveying device of claim 1, wherein the restraining surface is extended in parallel to the vertical direction.

5. The conveying device of claim 1, wherein an inclination angle of the sliding surface with respect to the first direction ranges from 20° to 70°.

6. The conveying device of claim 1, wherein each of the sliding surfaces is disposed not to be overlapped with each other in the vertical direction.

7. The conveying device of claim 1, wherein each of the intersecting surfaces connects the inclined surfaces adjacent to each other.

8. The conveying device of claim 7, wherein a lower end of each of the intersecting surfaces is connected to a lower end of one of the inclined surfaces adjacent to each other, and an upper end of the intersecting surfaces is connected to an upper end of one of the inclined surfaces adjacent to each other.

9. The conveying device of claim 1, wherein a length of each of the sliding surfaces is the same as a length of each of the inclined surfaces.

10. The conveying device of claim 1, wherein a number of the sliding surfaces is the same as a number of the inclined surfaces.

11. The conveying device of claim 1, wherein a length of the sliding surface of the treating area is longer than a length of the sliding surface of the preparation area.

12. The conveying device of claim 1, further comprising a discharge area in which an object to be conveyed treated in the treating area is conveyed, and in which one sliding surface and one restraining surface connected to each other,
   wherein a length of the sliding surface of the discharge area is longer than a length of the sliding surface of the preparation area.

13. The conveying device of claim 1, wherein a plurality of frames are provided, and the lifter and the drive unit have a number corresponding to a number of the frame.

14. The conveying device of claim 1, wherein the drive unit comprises:
   a linear motor which linearly moves in the first direction; and
   a mover which moves the lifter up and down by reciprocating in the first direction by the linear motor.

15. The conveying device of claim 14, wherein the mover comprises a moving surface inclined downward in the first direction, wherein the lifter comprises a guide surface which is in contact with at least a part of the moving surface and inclined downward in the first direction.

16. The conveying device of claim 15, further comprising a roller for reducing contact between the moving surface and the guide surface.

17. The conveying device of claim 1, wherein an object to be conveyed is lifted by the lifter on the one sliding surface and conveyed to the sliding surface of a next stage.

18. A fabric treating apparatus comprising:
   a cabinet defining a treating chamber in which clothes is accommodated;
   a heating unit for supplying at least one of hot air and steam into the treating chamber; and
   a conveying device for conveying clothes positioned outside the cabinet to the inside of the cabinet,
   wherein the conveying device comprises:
      a frame comprising at least two sliding surfaces inclined downward in a first direction, and at least two restraining surfaces that is disposed between the two sliding surfaces and defines a surface intersecting the sliding surfaces;
      a lifter comprising at least two inclined surfaces inclined downward in the first direction, and at least two intersecting surfaces that is disposed between the two inclined surfaces and defines a surface intersecting the inclined surfaces; and
      a drive unit which moves the lifter in a vertical direction intersecting the first direction,
      wherein each of the intersecting surface is disposed on an arbitrary line parallel to each of the sliding surfaces in the vertical direction.

19. The conveying device of claim 18, wherein some area in a middle of the frame in the first direction is positioned inside the cabinet.

20. The conveying device of claim 18, wherein the frame comprises:
   a treating area in which an object to be conveyed is treated, and which comprises one sliding surface and one restraining surface connected to each other; and
   a preparation area which is positioned before the object to be conveyed is conveyed to the treating area, and which comprises at least two sliding surfaces and at least two restraining surfaces.

* * * * *